United States Patent [19]

Chiu et al.

[11] 4,327,071

[45] Apr. 27, 1982

[54] METHOD OF PREPARING POTASSIUM HYDRIDE

[75] Inventors: Kuen-Wai Chiu, Mars; John R. Strickler, Pittsburgh, both of Pa.

[73] Assignee: Mine Safety Appliances Company, Pittsburgh, Pa.

[21] Appl. No.: 261,429

[22] Filed: May 7, 1981

[51] Int. Cl.³ ............................................. C01B 6/04
[52] U.S. Cl. .................................. 423/646; 423/645; 423/647
[58] Field of Search ....................... 423/646, 647, 645

[56] References Cited

U.S. PATENT DOCUMENTS

| | | | |
|---|---|---|---|
| 2,372,671 | 4/1945 | Hansley | 423/646 |
| 2,768,064 | 10/1956 | Baldridge | 423/646 |
| 3,387,933 | 6/1968 | Snyder | 423/646 |
| 3,617,218 | 11/1971 | Van Tamelen et al. | 423/646 |
| 3,998,941 | 12/1976 | Nelson | 423/646 |

*Primary Examiner*—Earl C. Thomas

[57] ABSTRACT

Potassium hydride and mixtures of potassium hydride with other alkali metal hydrides are prepared by contacting hydrogen with potassium or potassium alloys with other alkali metals, dispersed in an inert fluid, in the presence of a potassium phenanthride catalyst.

6 Claims, No Drawings

METHOD OF PREPARING POTASSIUM HYDRIDE

BACKGROUND OF THE INVENTION

Alkali metal hydrides have been prepared by reacting a dispersion of the alkali metal in heavy oils with hydrogen at high temperatures, e.g. 300° to 400° C., and high pressures, e.g. 100 to 150 psi. Such methods are disadvantageous in that expensive equipment is required to accommodate the severe conditions of reaction and the process utilizing hydrogen under high pressure presents hazards. For some purposes, as in manufacture of pharmaceuticals, the hydride must be free of oil residue and the complete removal of such residues is tedious and expensive.

U.S. Pat. No. 3,617,218 discloses a method of making alkali metal hydrides, especially sodium hydride, at low temperatures and atmospheric hydrogen pressure whereby sodium and a reactive aromatic or olefinic compound capable of forming a naphthalide type of anion and hydrogen are contacted in the presence of a Titanium IV catalyst. The patent identifies naphthalene and phenanthrene, among others, as suitable reactive organic compounds. High proportions of the organic reactant are used, exemplary amounts exceed the amount of alkali metal, as the method involves the formation of intermediate naphthalide-type compounds that react with hydrogen in the presence of the titanium catalyst.

BRIEF DESCRIPTION OF THE INVENTION

This invention is based on our discovery that potassium phenanthride effectively catalyzes the reaction of hydrogen with potassium and potassium alloys with other alkali metals. The catalytic action is specific to K and K-alloys and does not occur with other alkali metals such as sodium. In accordance with the invention, hydrogen is contacted with molten potassium or potassium alloy dispersed in an inert liquid medium in the presence of the catalyst. The catalyst may be provided as the potassium salt or formed in situ by reaction of provided phenanthrene with potassium or the alloy. The potassium salt may be mixed with other alkali metal phenanthride salts, as when catalyst from a K-alloy reaction is recovered and reused. The catalyst is effective in amounts of about 0.1 percent of the alkali metal weight or less and can be used in higher amounts up to about 12 percent of the alkali metal weight.

The catalyzed reaction proceeds rapidly at temperatures between about 95° C. and 200° C. with hydrogen at ordinary atmospheric temperature providing economies of preparation and permitting the use of lower boiling inert liquid dispersion mediums that are easily removed from product hydride. Hydrogen may be used at superatmospheric pressures if it is desired to accelerate the reaction. Aliphatic hydrocarbons are the preferred liquid reaction medium but other inert liquid hydrocarbons may be used. The liquid need not be a solvent for the catalyst. Examples of suitable solvents include mineral oil, kerosene, mineral spirits, decane, nonane, octane, heptane and hexane.

DETAILED DESCRIPTION OF THE PREFERRED EMBODIMENT

Example 1

300 ml of dry nonane, 1.39 g of phenathrene and 45.0 g of potassium were charged to a flask flushed with nitrogen and equipped with an atmospheric pressure bubbler. The nitrogen flush was stopped and hydrogen flow commenced. The flask was heated to melt the potassium (ca 65° C.) and the mixture was agitated to disperse the potassium in the liquid medium. The temperature was slowly raised and hydrogenation commenced at 96° C. The absorption of hydrogen gradually increased as the temperature was raised to 122° C., at which temperature the reaction became vigorously exothermic. Hydrogenation was complete within 30 minutes at reflux (ca 143° C.) as shown by monitoring flow rates of influent and effluent hydrogen. The resultant potassium hydride is filtered from the nonane, washed with a more volatile solvent such as hexane, and vacuum dried. The yield of greyish-white potassium hydride was substantially quantitative and, on hydroanalysis it yielded $H_2$ and KOH in relative molar amounts of 0.94 and 0.98. The catalyst can be recovered from the product quantitatively by extraction with tetrahydrofuran or other ether solvent, followed by removal of the solvent. The recovered catalyst retains its catalytic properties and can be reused through consecutive preparations.

Example 2

32.5 g of potassium and 32.5 g of sodium was melted and mixed together under a nitrogen atmosphere for about one hour in the apparatus used in Example 1. 300 ml of dry decane and 1.39 g of phenathrene were added to the liquid alloy at 60° C. A hydrogen flush was commenced and the alloy was dispersed. On heating, hydrogenation was observed to begin at about 80° C., during heating over 35 minutes to reflux temperature (158° C.) and continued at reflux for about 1.5 hours. A substantially quantitative yield of active hydride was separated from the reaction mixture that yielded exactly equal molar amounts of $H_2$ and hydride ion on hydrolysis.

Example 3 (Comparison Example)

Example 1 was repeated using sodium in place of potassium and mineral oil (Drake oil 10) in place of nonane. No hydrogen absorption was observed when the reactive mixture was heated to 200° C.

It should be understood that within the scope of the appended claims, the invention can be practiced otherwise than as described.

We claim:

1. A method of preparing potassium hydride and mixtures thereof with other alkali metal hydrides comprising contacting hydrogen and potassium or potassium alloys with other alkali metals dispersed in an inert liquid in the presence of a catalytically effective amount of potassium phenanthride.

2. A method according to claim 1 in which the temperature is between about 95° C. and 200° C.

3. A method according to claim 1 in which hydrogen pressure is substantially atmospheric.

4. A method according to claim 1 in which the inert liquid as an aliphatic hydrocarbon.

5. A method according to claim 1 in which the potassium is alloyed with sodium.

6. A method according to claim 1 in which the catalyst is formed in situ by reaction of phenanthrene with said potassium or potassium alloy.

* * * * *